United States Patent [19]

Strean

[11] Patent Number: 4,823,850
[45] Date of Patent: Apr. 25, 1989

[54] PULLTHROUGH DELIMBING DEVICE

[76] Inventor: John M. Strean, 3910 Highway 40 West, Columbia Falls, Mont. 59912

[21] Appl. No.: 235,119

[22] Filed: Aug. 23, 1988

[51] Int. Cl.⁴ .......................... A01G 23/08; B27L 1/00
[52] U.S. Cl. ..................................... 144/2 Z; 144/343
[58] Field of Search ........................ 144/2 Z, 3 D, 343

[56] References Cited

U.S. PATENT DOCUMENTS

| | | | |
|---|---|---|---|
| 3,868,981 | 3/1975 | Nadeau | 144/2 Z |
| 4,050,486 | 9/1977 | Whitcomb | 144/2 Z |
| 4,067,367 | 1/0000 | Adamson | 144/2 Z |
| 4,335,766 | 6/1982 | Davis | 144/2 Z |
| 4,440,202 | 4/1984 | Everett | 144/2 Z |

*Primary Examiner*—W. Donald Bray
*Attorney, Agent, or Firm*—Keith S. Bergman

[57] ABSTRACT

A simple pullthrough-type device is disclosed for simultaneoulsy delimbing single or amassed groups of several felled trees. A base and interconnected vertical support cooperatively mount a lower fixed delimbing jaw below a pivotally movable upper delimbing jaw, both carried by the vertical support and extending over the base. The upper delimbing jaw carries a pivotally depending delimbing element to aid in maintaining tree contact during the delimbling process. All delimbing portions of both jaws are provided with knives on their tree contacting surfaces to cut limbs from trees that are reciprocatably moved forwardly and rearwardly through the jaws by separate tree moving apparatus such as either a crawler tractor or a wheeled skidder equipped with either a grapple or chokers.

6 Claims, 2 Drawing Sheets

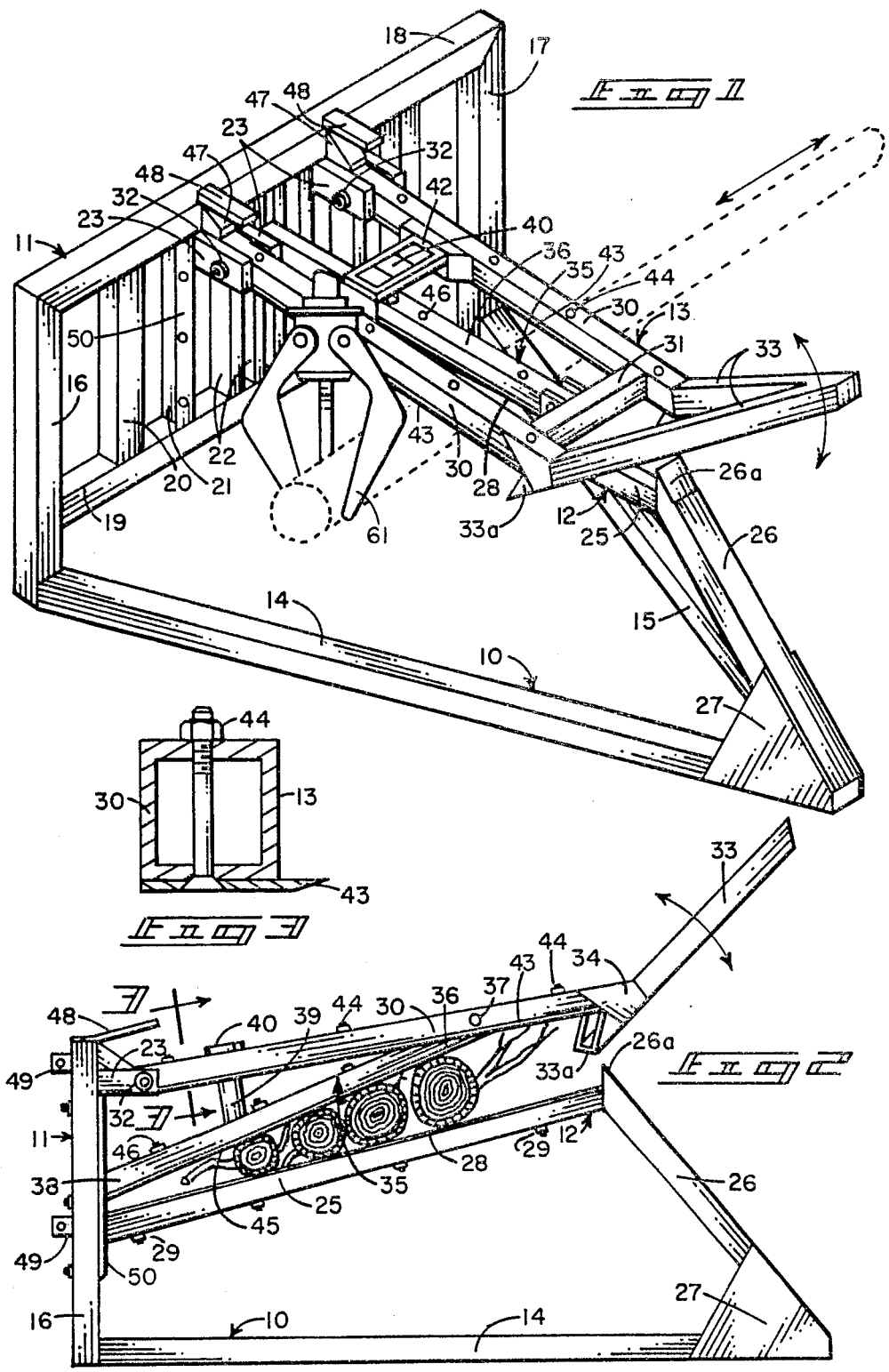

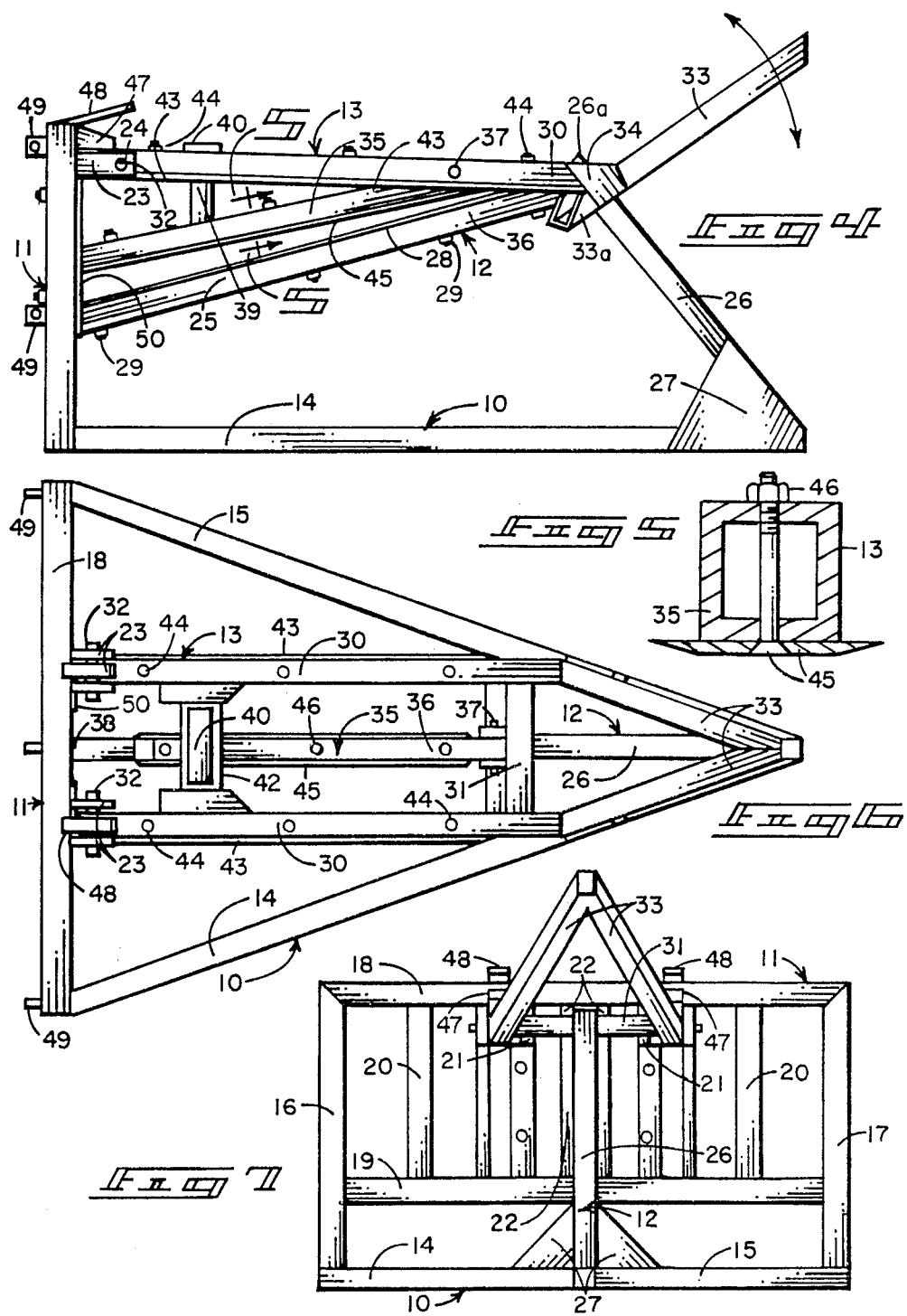

PULLTHROUGH DELIMBING DEVICE

BACKGROUND OF INVENTION

1. Related Applications

There are no applications related hereto heretofore filed in this or any foreign country.

2. Field of Invention

My invention relates generally to delimbing devices for logging and more particularly to an unpowered pivotal jaw type delimbing device that cuts limbs upon tree motion in either of two opposite directions through the jaws.

BACKGROUND AND DESCRIPTION OF PRIOR ART

The logging industry in its recent development has become increasingly competitive to a point where substantial mechanization is essential for economic survival, at least in the domestic branch of that industry. One area where this mechanization has well developed and reached a high point of sophistication is in the delimbing of trees after their cutting and prior to their sectioning into commercial logs of merchandisable lengths. Although many and various delimbing devices have heretofore become known, unsolved problems remain, some of which are solved by my instant invention.

Delimbers in their recent course of development have become increasingly sophisticated in an attempt to satisfy the economic requirements of modern logging, until they not only provide a delimbing function, but also perform other associated activities even extending to the cutting of standing trees, the moving of both trees and logs to and from a delimbing device, and the cutting of trees into logs of appropriate commercial lengths. Such mechanisms have become so complex that their sophistication oftentimes defeats the purpose of their existence in the first instance, especially in smaller Western logging operations. These sophisticated delimbers are quite expensive, oftentimes costing substantially in excess of $100,000.00, and many of the functions that they perform are functions that might be performed by other existing logging machinery, which generally is either idled or not used to its fullest extent when such delimbers are used. This situation tends to reduce the potential usability of all of the capital items of a logging operation to make that operation overall less economically efficient.

My invention seeks to overcome this problem by providing a relatively simple delimbing device that performs only the delimbing operation while using other existing logging equipment to do the things that that equipment commonly does to aid in performing the delimbing function. This simplification of the delimbing device aids substantially in its economic functioning by requiring a substantially lower initial capital investment and also by making use of other capital equipment that is already available and generally would not be otherwise fully used during a delimbing process.

My delimbing device provides a fixed lower jaw and an upper jaw pivoted at one end between which unlimbed trees may be placed and moved to remove limbs from them. Most simple delimbing devices of the prior art have provided a completely peripherally enclosed orifice of some sort, sometimes with somewhat movable peripheral elements such as cable, through which a single tree is moved lineally for delimbing. My delimber differs essentially from this type of structure in not having a totally enclosed periphery about the delimbing area so that trees may be easily moved into and removed from between the jaws of the device from an external lateral position, whereas with delimbers having totally closed peripheries a tree must be inserted endwise into the delimbing structure for use of that device. Closed periphery delimbing devices are not particularly efficient in use as it is time consuming and difficult to move a tree appropriately to insert it endwise within the orifice defined by the delimbing structure. The problem is further exacerbated by the fact that in general a delimbing orifice cannot be much larger than a tree to be delimbed or it will not serve its purpose and oftentimes if its peripheral elements be relatively movable, those elements must be biased to an inward position, all to make insertion of a tree therein even more difficult.

Such prior delimbing devices that provide continuous delimbing structure about the entire periphery of a tree also have generally delimbed only one tree at a time, generally necessarily by reason of the essence of the delimbing structure itself. My delimber in contradistinction provides a substantial delimbing area between its jaw wherein a plurality of reasonably coherently amassed trees may be delimbed simultaneously to not only make the delimbing operation simpler, but also to make it much more rapid and therefore less costly.

Many known simple delimbing structures have not been particularly effective in their delimbing functions because firstly, they have tended to break rather than cut limbs from trees and secondly, they have not been designed to allow reciprocating motion of trees through the delimbing structure to remove limbs or portions of limbs that previously had not been removed. My invention solves these problems by providing knives that cut limbs from a tree trunk rather than break them, as is the case with various cable-type delimbers. My invention also provides a movable jaw structure with knives facing in both forward and rearward directions of tree motion so that trees are operated upon when moved either forwardly or rearwardly through the device. Commonly with use of my invention, a plurality of trees will be grasped by traditional log moving devices at their butts and moved into the jaws of the delimber as an amassed group thence to be moved alternately forwardly and rearwardly therethrough until substantially all of the limbs are removed from the trees. This generally is not possible with delimbers defining a fixed periphery about a delimbing channel, such as those commonly formed of cables. With such a device, limbs are broken rather than cut and they are broken with some efficiency only when the tree is moved top first through the delimbing orifice as limbs tend not to be broken if a tree is moved butt first through the orifice.

My invention further provides an openable jaw type structure that is easier to load and unload with trees than prior art devices, particularly those of the closed periphery type. With my device a group of trees may be grasped near their butts by an ordinary claw-type grapple carried by a skidding machine and moved up to the delimber thence between the jaws by the grapple or choker and thence moved reciprocally therethrough without ever releasing the grapple or choker attachment to those trees. This provides a simple operation that may be rapidly accomplished, which is not the case with prior art delimbers which must multiply grasp and release trees for their operation.

My delimber further provides a relatively small, simple structure which may be readily moved to the immediate vicinity where trees are felled, to there carry out its delimbing functions. Its small, compact nature allows easy positional maintenance, especially by interconnection with trees or stumps or with existing logging equipment that may be stationary and otherwise unused during the delimbing operation. This is in contradistinction to prior art delimbing devices which have been of a larger, more extensive nature to require substantial effort and large anchoring structures for positional maintenance during delimbing to lessen both mobility for transport and adaptability for positioning in a tree cutting area.

The particular structure of the jaws of my invention also provides a delimbing device that is more effective then jaw delimbers heretofore known. I accomplish this result by providing an upper pivotally mounted jaw that is downwardly biased toward a lower jaw, but has a separate cutting element that is pivotally mounted on the upper jaw at its end opposite its pivotal mounting on a base supporting structure. This provides a more intimate contact of limb cutting knives both with the periphery of individual trees and with the peripheries of groups of trees carried within the jaw structure for delimbing.

My invention resides not in any one of these features per se, but rather in the synergistic combination of all of them in the particular structures that give rise to the functions necessarily flowing therefrom, as more fully set forth in the following specification and claims.

SUMMARY OF INVENTION

My invention provides a horizontal base member supporting an upstanding vertical support element at one side, to cooperatively support a delimbing jaw structure spacedly above the horizontal base member.

The delimbing jaw structure provides a stationary lower jaw with a delimbing beam sloping downwardly toward the upright support and a pivotally mounted upper jaw structure carried for motion in a vertical plane above the lower jaw. Both jaws have flaring outer end elements to aid insertion of trees therebetween by moving the trees toward and into the jaw structure. The upper pivotal jaw carries a vertically movable delimbing element that is pivotally supported in the outer portion of the upper jaw to aid in maintaining delimbing contact with trees in the delimbing structure. All tree contacting surfaces of the delimbing elements carry knives having blades extending perpendicularly in both directions to the principal plane of the jaw structure to cut limbs from trees being moved therethrough in either direction. Fastening means are provided to aid in positionally maintaining the delimber during operation.

In creating such a device, it is:

A principal object of my invention to provide a jaw type mechanism that delimbs one or a group of trees moved reciprocally in a perpendicular elongate direction through the delimbing jaws.

A further object of my invention to provide such a mechanism that allows handling of one or a group of trees in the delimbing operation by a typical skidding machine equipped with either a grapple or choker without releasing the trees from the time of their insertion until their removal.

A still further object of my invention to provide such a mechanism that has a pivotally mounted compound upper jaw with a secondary delimbing element pivotally depending from its outer end part to better contain and more immediately contact trees between the delimbing jaws.

A still further object of my invention to provide such a mechanism that has knives carried by the delimbing members and extending in both directions perpendicular to the principal plane of the jaw structure to cut limbs from trees moved either forwardly or rearwardly through the jaw structure.

A still further object of my invention to provide such a delimber that is of relatively small, compact structure and one that may be readily moved to a delimbing site and there fastened on existing objects for positional maintenance during use.

A still further object of my invention to provide such a delimber that is of a new and novel design, of rugged and durable nature, of simple and economic manufacture and otherwise well suited to the uses and purpose for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an isometric surface view of my delimber showing its various parts, their configuration and relationship.

FIG. 2 is a vertical end view of the structure of FIG. 1 with several trees shown in delimbing position between the delimbing jaws.

FIG. 3 is a vertical cross-sectional view through one upper jaw beam of FIG. 2, taken on the line 3—3 thereon in the direction indicated by the arrows.

FIG. 4 is an end view, similar to FIG. 2, showing the delimber in relaxed condition without trees between its jaws.

FIG. 5 is a vertical cross-sectional view through the auxiliary delimbing element of the upper jaw of FIG. 4, taken on the line 5—5 thereon in the direction indicated by the arrows.

FIG. 6 is an orthographic top view of the structure of FIG. 5 showing its various parts from this aspect.

FIG. 7 is an orthographic side view looking inwardly at the jaw structure from a lateral position.

DESCRIPTION OF THE PREFERRED EMBODIMENT

My invention generally comprises base 10 structurally communicating with vertical support 11 to fixedly mount lower delimbing jaw 12 and pivotally mount upper delimbing jaw 13 thereabove.

Base 10 is formed by similar angularly disposed lateral beams 14, 15 joined in their outer end parts and diverging angularly in their inner portions. The included angle between these beams is about 60 degrees and the undersurfaces of the beams are substantially coplanar to allow support upon a flat supporting surface.

Vertical support 11 defines a vertical wall-like structure comprising end beams 16, 17 structurally carried respectively by the inner end portions of base side beams 14, 15 and extending vertically upwardly therefrom. Horizontal upper side beam 18 and lower side beam 19 communicate between the end beams in their upper and medial portions respectively, as illustrated. Appropriate internal supports 20, as required, are included within the vertical support structure to provide necessary strength and rigidity and mounting means for other structures, depending upon the particular parameters and configurations involved in an individual mechanisms. Paired sets of vertical jaw support elements 21, 22 are carried in spaced adjacency in the medial portion of vertical support 11 to aid fastening and motion of the jaw structure. These elements in their upper portions, immediately downwardly adjacent upper side beam 18, carry paired, spaced outwardly extending fastening ears 23 defining holes to pivotally mount the upper jaw structure upon the support fastening ears.

Lower delimbing jaw 12 provides elongate delimbing beam 25 fixedly supported in a downwardly and inwardly sloping orientation as illustrated. The outer portion of delimbing beam 25 is supported in its outermost end by structural intercommunication with downwardly and outwardly angling support beam 26 which is structurally carried in its outer part by the joined apex portion of side beams 14, 15 of the base member. In the instance illustrated, the support of support beam 26 on the base member is strengthened and enhanced by filets 27. The inner end portion of delimbing beam 25 is supported by structural intercommunication with vertical support 11. In the instance illustrated this support is accomplished by the delimbing beam communicating between the adjacent surfaces of inner beam supports 22. Preferably these members are so configured that delimbing beam 25 has a downward and inward slope of approximately fifteen to twenty degrees from the horizontal to aid in maintaining trees within the jaw structure during delimbing.

The upper surface of delimbing beam 25 carries elongate knives 28 extending beyond each edge of the beam to sever limbs from trees passing upwardly adjacent thereto. These knives commonly are separately formed and positioned upon the delimbing beam in a releasable fashion, as illustrated, by nut-bolt combinations 29 to allow knife removal for sharpening and replacement as necessary. The knives may be joined permanently by welding, if desired. Knives 28 preferably provide a chisel-type bezel with an upward sloping surface so that edge will not gouge into a tree trunk from which limbs are removed. The length of these knives is such as to extend substantially along the length of delimbing beam 25, at least through all portions of the beam that contact trees to be delimbed.

Upper delimbing jaw 13 provides two spaced similar delimbing beams 30 structurally interconnected in their outer end parts by cross support 31. The beams are pivotally mounted in their inner end part upon short jack axles 32 journaled between each of fastening ears 23 carried by vertical support 11. The axles carry collars 32 in each of their end parts, outwardly adjacent the outer surfaces of the fastening ears, to maintain the axle within those ears and prevent any axially directed motion thereof.

The outer ends of delimbing beams 30 structurally carry the inner end portions of jaw beams 33 which angle upwardly and toward each other in their outward extension so that their outer end portions may be structurally joined. These upper jaw beams cooperate with support beam 26 of the lower jaw structure to form an outwardly flaring jaw structure to aid the insertion of trees between the jaws. Appropriate filets 34 may be provided at points of joinder of the various elements to provide additional structural rigidity and strength, if necessary.

Auxiliary upper jaw delimbing element 35 provides elongate delimbing beam 36 pivotally carried in its outer part upon axle 37 journaled between the outer medial portions of upper jaw delimbing beams 30. The inner end of delimbing beam 36 defines inner guide element 38 which moves vertically between intermediate supports 22 to guide the delimbing beam and provide additional stability and rigidity against lateral displacement.

The inner medial portion of delimbing beam 36 structurally carries upwardly extending stop shaft 39 having upper headed portion 40. This stop shaft 39 is slidably carried in orifice defined in cross beam 42 extending between the two delimbing beams 30 in their medial inner portion. Headed portion 40 of the stop shaft limits the downward motion of that element, and therefore the downward motion of ancillary delimbing member 35, to maintain that member within a spaced distance below delimbing beams 30 so that it will not foul on trees or limbs that are being inserted or operated upon within the jaws of my delimbing device.

It is to be noted that the upper pivotal jaw will always be maintained above the lower stationary jaw by cross member 31 which will necessarily rest on the forward portion of lower jaw delimbing beam 25. It is further to be noted that the inner end of support beam 26 extends somewhat above delimbing beams 25 at their point of communication to provide portion 26a that extends above the support beam to aid in maintaining trees being delimbed within the jaw structure. Similarly, the inner ends of jaw beams 33 extend somewhat downwardly beyond their intersection with delimbing beams 30 of the upper jaw structure to provide projections 33a that also tend to maintain trees within the jaw structure. Preferably all of these projections are wedge shaped, somewhat as illustrated, so that they do not interfere particularly with the placement of trees between the jaws, but do tend to substantially interfere with outwardly movement of trees therefrom.

The upper surfaces of delimbing beams 30 are stopped in their upward motion by dogs 48 carried by the upper surface of upper side beam 18 of the vertical side support and projecting outwardly from it, as illustrated. This stop structure is not necessary to my invention, but is convenient in preventing the upper jaw from moving too far upwardly to an off-center position where gravity will not maintain a downward bias upon it.

Delimbing beams 30 each carry similar elongate flat knives 43 on their lower outer surfaces with the blade of one knife projecting in a direction away from the blade of the other knife. These blades in the illustration are fastened by nut-bolt combinations 44 for releasable structural joinder to allow replacement and maintenance, but they may also be fixedly joined, if desired. It is not necessary that knives 43 be two sided as a tree passing through the jaws of the device will be delimbed in one direction by the knife on one beam and in the other direction by the knife of the other delimbing beam. Auxiliary delimbing beam 36 carries two-sided knife 45 on its undersurface, again with the knife edges extending laterally on each side of that beam. This knife 45 is similarly fastened to its supporting beam by fasteners 46. Knives 50 are carried by the outwardly facing forward and rearward edges of opposed medial supports 21, above the level of the inner portion of the fixed delimbing beam 25 to aid delimbing in this area. These knives are structurally carried in the same fashion as heretofore described for other delimbing knives. Preferably all of these knives have a wedge-shaped blade with the longer angled blade surface on the tree facing side, as illustrated particularly in FIGS. 3 and 5.

All of the structural elements of my delimbing mechanism must be formed of some reasonably strong, durable material to sustain the substantial forces, stresses and strains placed upon them in their normal operation. About the only material having appropriate physical characteristics to provide appropriate durability is one of the harder knife or tool steels. The particular configuration of the structural elements illustrated is that of channel-type beams, but obviously other cross-sectional shapes of these elements might serve the purposes of my invention, if not so well.

The rearward side of vertical support 11 is provided with bracketry 49 to aid fastening to some logging tool, implement or other supportative structure or object. In the instance illustrated, this bracketry is particularly spacedly arrayed for fastening to a three-point hydraulic hitch of an ordinary tractor.

Having thusly described the structure of my invention, its operation may be understood.

Firstly, a delimber is formed according to the foregoing specification and illustrations. The delimber is then moved to an area of use where access may be had by ordinary logging devices, such as a grapple skidder. Once located, the delimber is fastened for positional maintenance. Such fastening may be accomplished by means of the bracketry 49 carried by vertical support 11 by fastening that bracketry to existing logging machinery or to independent fixedly positioned structures or objects, such as stumps or trees in the area. The area where the delimber is positioned should be reasonably flat to provide adequate support for base 10 and this also tends to aid positional maintenance. The positioning of the base may be further aided by driving stakes into the earth adjacent the base or by the use of other permanently affixed structures or devices.

Once the delimber is positioned, one or a group of trees are grasped by skidding grapple 61, or chokers near their butt ends. The trees are pulled to the delimbing mechanism in a course that would pass immediately outwardly of the jaws of the structure and as a skidder moves immediately past the delimbing device, it is turned radically inwardly toward the delimber to move the trees it carries within the gap defined between the jaw structures of the delimber. The jaws will be opened by the trees and they will move inwardly between the delimbing jaws with their lower surfaces resting upon lower jaw delimbing beam 25 and with the undersurface of upper jaw delimbing beams 30 and auxiliary beam 35 resting on their upper surfaces. The upper pivotally mounted delimbing jaw will be biased to a downward position by gravity forces acting upon its cantilever structure outwardly of its pivot point.

With the delimber and trees thusly positioned, the trees are moved forwardly through the jaw structure by motion of the skidder carrying them and as this occurs, the knives of the delimber structure will cut off limbs that are contacted by them. Normally trees will not be completely delimbed in the first pass through the delimbing jaws and they are thence moved rearwardly back through the jaws to further delimb them as they are moved in a rearward direction through the jaws. This process is continued until all of the trees are satisfactorily delimbed. At that point the trees are moved forwardly out of the jaws of the delimber to be disposed for further processing.

In performing the delimbing function, especially with a group of trees, it is to be noted that limbs on adjacent trees will tend to be positioned in some direction other than toward each other, which will tend to orientate those limbs so that cutting will be more probable than in the case of a random orientation. It is also to be noted that a tree may be turned about its axis during the delimbing operation, if necessary or desired, to assure the cutting of all limbs extending about its periphery. Commonly this will not be necessary in the ordinary use of my delimber as trees being delimbed will reorientate themselves sufficiently in the course of their motion during repeated passage through the delimbing jaws to accomplish the same result. If, after the delimbing operation is completed, there still remain a few limbs that are difficult of removal, these limbs may readily be cut from a tree by ordinary manual methods if this be faster or easier than continuing the delimbing operation with my mechanism.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A pull through, movable jaw type delimbing device for cut trees, comprising, in combination:
   a base having a planar lower surface structurally supporting an elongate substantially perpendicular support member at one side edge;
   a lower delimbing jaw, fixedly mounted between the base and the vertical support, defining an elongate delimbing beam sloping downwardly and inwardly to the support member and a support beam extending downwardly and outwardly from the delimbing beam to the base;
   an upper delimbing jaw having at least one elongate delimbing beam pivotally interconnected at a first inner end to the upper medial part of the vertical support to extend over the lower jaw, said upper delimbing beam carrying at its outer end an upwardly and outwardly extending jaw beam and having an auxiliary delimbing member pivotally interconnected in the medial outer portion of the delimbing beam to extend inwardly for limited downward motion relative to the upper delimbing beam.

2. The invention of claim 1 further characterized by each of the delimbing jaws having knife means on their tree contacting surfaces to cut limbs from trees carried between each said jaws.

3. The invention of claim 1 further characterized by the auxiliary delimbing member having an inner portion mounted to the vertical support for slidable vertical motion relative thereto.

4. The invention of claim 1 further characterized by:
   the upper delimbing jaw comprising two similar spaced elongate delimbing beams each pivotally interconnected at their first inner ends to the vertical support and fixedly interconnected to each other at their second outer ends by the jaw beams.

5. A pull-through movable jaw-type device for delimbing cut trees, comprising, in combination:
   a triangular base structurally mounted to an elongate vertical support along its first inner elongate edge opposite the base apex;
   a fixed lower delimbing jaw having a support beam mounted from the apex of the base upwardly and inwardly to a lower delimbing jaw beam extending inwardly and downwardly to support in the medial portion of the vertical support, said delimbing beam having knife means extending laterally beyond the lateral edges of the upper surface thereof;
   an upper delimbing jaw having spaced opposed delimbing beams pivotally carried in their inner end portions by the upper part of the vertical support for extension over the lower delimbing jaw, said upper delimbing jaw beams being mounted at their outer part with upwardly angled jaw beams having interconnected outer ends; and
   an auxiliary delimbing member pivotally carried in its outer end part by the outer medial portion of the upper delimbing jaw, said auxiliary delimbing member having a delimbing beam extending inwardly to the vertical support with means of limiting its downward motion to a spaced distance below the upper jaw and knife means on its lower surface with edges projecting laterally on each side of said delimbing member.

6. The invention of claim 5 further characterized by both the upper and lower jaw members having means in their outer portions to aid in maintaining trees therebetween and the vertical support structure having at least one vertical member carrying vertical knives extending beyond the outer lateral edges thereof on their tree contacting surface.

* * * * *